(12) United States Patent
Wang

(10) Patent No.: US 12,168,198 B2
(45) Date of Patent: Dec. 17, 2024

(54) RESOURCE RECOVERY SYSTEM FOR REDUCING CARBON DIOXIDE EMISSION

(71) Applicant: Chi-Sheng Wang, Irvine, CA (US)

(72) Inventor: Chi-Sheng Wang, Irvine, CA (US)

( * ) Notice: Subject to any disclaimer, the term of this patent is extended or adjusted under 35 U.S.C. 154(b) by 379 days.

(21) Appl. No.: 17/828,822

(22) Filed: May 31, 2022

(65) Prior Publication Data

US 2023/0330592 A1 Oct. 19, 2023

(30) Foreign Application Priority Data

Apr. 19, 2022 (TW) .................................. 111114869

(51) Int. Cl.
*B01D 53/14* (2006.01)
(52) U.S. Cl.
CPC ..... *B01D 53/1475* (2013.01); *B01D 53/1418* (2013.01); *B01D 53/1431* (2013.01); *B01D 2257/504* (2013.01); *B01D 2259/818* (2013.01)
(58) Field of Classification Search
CPC ............ B01D 53/1475; B01D 53/1418; B01D 53/1431; B01D 2257/504; B01D 2259/818
See application file for complete search history.

(56) References Cited

U.S. PATENT DOCUMENTS

| 2013/0264187 A1* | 10/2013 | Yang | B01J 19/126 204/168 |
| 2016/0107118 A1* | 4/2016 | Yablonsky | B01D 53/62 422/608 |
| 2018/0154307 A1* | 6/2018 | Chen | B01D 53/62 |
| 2023/0402635 A1* | 12/2023 | Maceda | C25B 15/08 |

* cited by examiner

*Primary Examiner* — Dung H Bui
(74) *Attorney, Agent, or Firm* — Rosenberg, Klein & Lee

(57) ABSTRACT

A resource recovery system for reducing carbon dioxide emissions is revealed. Salt is delivered to a first plasma decomposition unit and decomposed into sodium and chlorine. The sodium is sent to a hydrolysis unit and mixed with water to get pure hydrogen and sodium hydroxide which are respectively sent to a power generation unit for power generation and a carbon dioxide absorption unit to react with carbon dioxide from air and produce a mixture of sodium carbonate and sodium bicarbonate. Then the mixture is delivered to an electric heating unit and broken into carbon dioxide and sodium hydroxide. The carbon dioxide is sent to a second plasma decomposition unit and decomposed into carbon and oxygen gas which is delivered to the power generation unit for generating power. Thereby catalysts, power required, and coproducts are obtained during operation of the system. Therefore, the system offers energy, environmental, and economic benefits.

6 Claims, 6 Drawing Sheets

RESOURCE RECOVERY SYSTEM FOR REDUCING CARBON DIOXIDE EMISSION

BACKGROUND OF THE INVENTION

Field of the Invention

The present invention relates to a system involved in fields of environmental protection, energy, and water resource, especially to a system which reduces carbon dioxide emissions to the environment effectively and produces a plurality of important coproducts for industrial use.

Description of Related Art

Among pollutants that contribute to greenhouse effect, carbon dioxide is one of the most important influential factors. Thus there is a need to reduce carbon dioxide emissions as well as collect and reuse the carbon dioxide emitted to decrease the concentration of carbon dioxide in the atmosphere.

SUMMARY OF THE INVENTION

Therefore, it is a primary object of the present invention to provide a resource recovery system for reducing carbon dioxide emissions which not only efficiently reduces the amount of carbon dioxide in the environment but also generates a plurality of important coproducts for industrial use.

In order to achieve the above object, a resource recovery system for reducing carbon dioxide emissions according to the present invention is provided. First the seawater is transported to an evaporation unit to produce fresh water and salts, and then the salt is delivered to a first plasma decomposition unit and decomposed into sodium and chlorine. Then the sodium is sent and mixed with water in a hydrolysis unit to get pure hydrogen and sodium hydroxide which are respectively delivered to a power generation unit for power generation and a carbon dioxide absorption unit to react with carbon dioxide from the atmosphere and produce a mixture of sodium carbonate and sodium bicarbonate. Then the mixture is delivered to an electric heating unit and broken into carbon dioxide and sodium hydroxide. The carbon dioxide is sent to a second plasma decomposition unit and decomposed into carbon and oxygen gas which is delivered to the power generation unit for generating power. Thereby catalysts and power required by the present system are obtained during operation of the system so that cost of the chemical catalysts and the power is saved. Moreover, fresh water, chlorine gas, sodium hydroxide, power, carbon, etc. generated during operation of the present system are all important coproducts for industrial use and able to be sold profitably. Therefore, the present system provides energy, environmental, and economic benefits.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 2 1 is a schematic drawing showing a structure of another embodiment according to the present invention;

DETAILED DESCRIPTION OF THE PREFERRED EMBODIMENT

Figure 1:
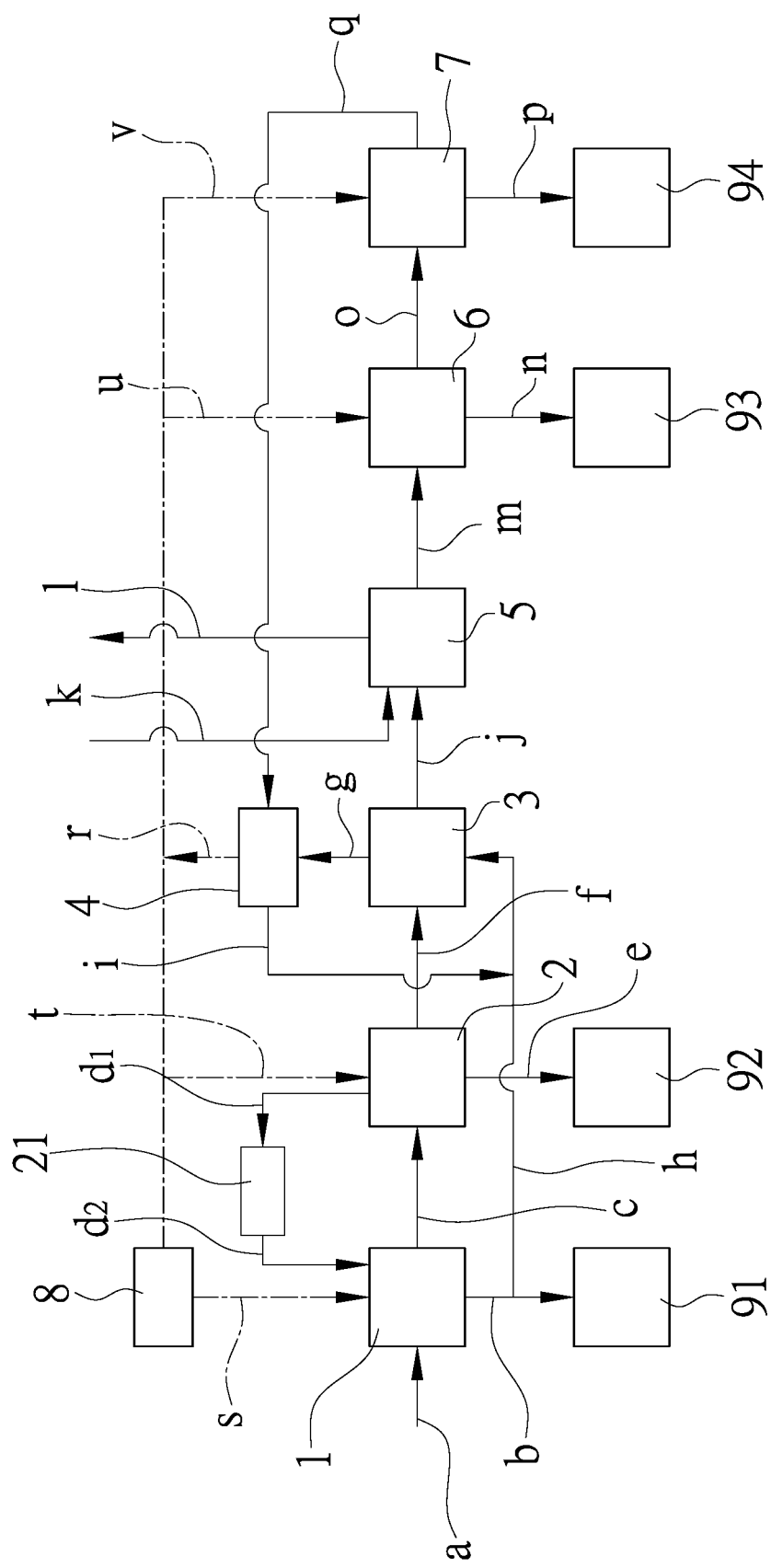
FIG. 1 is a schematic drawing showing a structure of an embodiment according to the present invention.

Refer to FIG. 1, a resource recovery system for reducing carbon dioxide emissions according to the present invention includes an evaporation unit 1, a first plasma decomposition unit 2, a hydrolysis unit 3, a power generation unit 4, a carbon dioxide absorption unit 5, an electric heating unit 6, a second plasma decomposition unit 7, an electricity storage unit 8, a fresh water collection unit 91, a chlorine collection unit 92, a sodium hydroxide collection unit 93, and a carbon collection unit 94. The evaporation unit 1 which is a rotary evaporator is connected with a seawater pipeline a while a first fresh water pipeline b is located between and used to connect the evaporation unit 1 and the fresh water collection unit 91. The evaporation unit 1 is further connected with the first plasma decomposition unit 2 which is a photon-plasma decomposition device by a salt pipeline c. The first plasma decomposition unit 2 is connected with a heat recovery unit 21 by a first heat pipeline d1 located therebetween and the heat recovery unit 21 is connected with the evaporation unit 1 by a second heat pipeline d2 located therebetween. The first plasma decomposition unit 2 is further connected with the chlorine collection unit 92 and the hydrolysis unit 3 respectively by a chlorine pipeline e and a sodium pipeline f correspondingly. The power generation unit 4 which can be a proton exchange membrane (PEM) fuel cell generator is connected with the hydrolysis unit 3 by a hydrogen pipeline g. The evaporation unit 1 and the hydrolysis unit 3 are connected by a second fresh water pipeline h which is provided with a connector. The power generation unit 4 is connected with the connector of the second fresh water pipeline h by a pure water pipeline i. The hydrolysis unit 3 and the carbon dioxide absorption unit 5 are connected by a sodium hydroxide pipeline j located therebetween. The carbon dioxide absorption unit 5 is further connected with at least one air pipeline containing carbon dioxide k and at least one air pipeline without carbon dioxide 1, both provided with an air pump. The carbon dioxide absorption unit 5 and the electric heating unit 6 are connected by a mixture pipeline m therebetween while the electric heating unit 6 is connected with the sodium hydroxide collection unit 93 and the second plasma decomposition unit 7 by a sodium hydroxide pipeline n and a carbon dioxide pipeline o respectively. The second plasma decomposition unit 7 which can be a photon-plasma decomposition device is connected with the carbon collection unit 94 and the power generation unit 4 by a carbon pipeline p and an oxygen pipeline q respectively while the power generation unit 4 is connected with the electricity storage unit 8 by a power input circuit r. The electricity storage unit 8 is further connected with the evaporation unit 1, the first plasma decomposition unit 2, the electric heating unit 6, and the second plasma decomposition unit 7 by a first power output circuit s, a second power output circuit t, a third power output circuit u, and a fourth power output circuit v respectively.

While in use, seawater is delivered into the evaporation unit 1 through the seawater pipeline a. The seawater in the evaporation unit 1 is separated into fresh water and highly concentrated salt water which mainly contains sodium chloride (NaCl). Then the fresh water is sent from the evaporation unit 1 to the fresh water collection unit 91 for collection through the first fresh water pipeline b connected with the evaporation unit 1 while the salt water is delivered to the first plasma decomposition unit 2 through the salt pipeline c connected with the evaporation unit 1. In the first plasma decomposition unit 2, sodium chloride in the salt water is decomposed into sodium (Na) and chlorine ($Cl_2$) and a lot of heat is released during the decomposition process. The heat released is delivered to the heat recovery unit 21 through the first heat pipeline d1 connected with the first plasma decomposition unit 2 and further sent to the evaporation unit 1 through the second heat pipeline d2 connected with the heat recovery unit 21 for providing energy which the evaporation unit 1 needs to separate the seawater into the fresh water and the highly concentrated salt water. As to the chlorine, it is sent to the chlorine collection unit 92 for collection through the chlorine pipeline e connected with the first plasma decomposition unit 2 while the sodium is delivered to the hydrolysis unit 3 through the sodium pipeline f connected with the first plasma decomposition unit 2.

The hydrolysis unit 3 and the evaporation unit 1 are connected by the second fresh water pipeline h used for sending the fresh water to the hydrolysis unit 3. Then the water reacts with the sodium in the hydrolysis unit 3 to produce hydrogen gas and sodium hydroxide (NaOH). The hydrogen gas generated is sent from the hydrolysis unit 3 to the power generation unit 4 through the hydrogen pipeline g for generating power and pure water and the power generated is sent to the electricity storage unit 8 through the power input circuit r for storage and providing energy required for operating the whole system. The residual energy can be used for other purposes. The pure water obtained is delivered to the hydrolysis unit 3 through the pure water pipeline i and the second fresh water pipeline h connected for reaction with sodium. As to the sodium hydroxide, it is delivered to the carbon dioxide absorption unit 5 through the sodium hydroxide pipeline j.

Air containing carbon dioxide in the atmosphere is drawn into the carbon dioxide absorption unit 5 by using the air pump of the air pipeline containing carbon dioxide k. Then the carbon dioxide contained in the air reacts with sodium hydroxide in the carbon dioxide absorption unit 5 to get a mixture of sodium carbonate (Na2CO3) and sodium bicarbonate (NaHCO3). After the reaction, the air which contains no carbon dioxide is returned to the atmosphere through the air pipeline without carbon dioxide 1. The mixture of sodium carbonate and sodium bicarbonate is delivered to the electric heating unit 6 through the mixture pipeline m to be broken into carbon dioxide and sodium hydroxide (NaOH) which is sent to the sodium hydroxide collection unit 93 for collection through the sodium hydroxide pipeline n connected with the electric heating unit 6. As to the carbon dioxide, it is delivered to the second plasma decomposition unit 7 through the carbon dioxide pipeline o to be decomposed into carbon and oxygen (O2) in the second plasma decomposition unit 7. The carbon obtained is sent to the carbon collection unit 94 for collection through the carbon pipeline p while the oxygen is delivered to the power generation unit 4 through the oxygen pipeline q for cyclic power generation.

The present system only uses seawater and captures carbon dioxide from the atmosphere so that no other resources are required. The carbon dioxide from the atmosphere is directly reacts with sodium hydroxide in the carbon dioxide absorption unit 5 to form a mixture of sodium carbonate (Na2CO3) and sodium bicarbonate (NaHCO3). Then concentrated carbon dioxide obtained by the mixture of sodium carbonate and sodium bicarbonate treated in the electric heating unit 6 is directly sent to the second plasma decomposition unit 7 and carbon is generated. There is no need to store carbon dioxide so that cost of devices required for sequestering and storing carbon dioxide from the atmosphere can be saved. Catalysts and power required by the present system are obtained by decomposition of seawater. Thus cost of the catalysts and the power is also saved. During the use of the power, no carbon dioxide is released and thus the present system is more environmental-friendly. Moreover, fresh water, chlorine gas, sodium hydroxide, hydrogen, power and carbon generated during operation of the present system are all important coproducts for industrial use, able to be offered for sale to make a great income. Therefore, the present system provides significant environmental and economic benefits.

Figure 2:
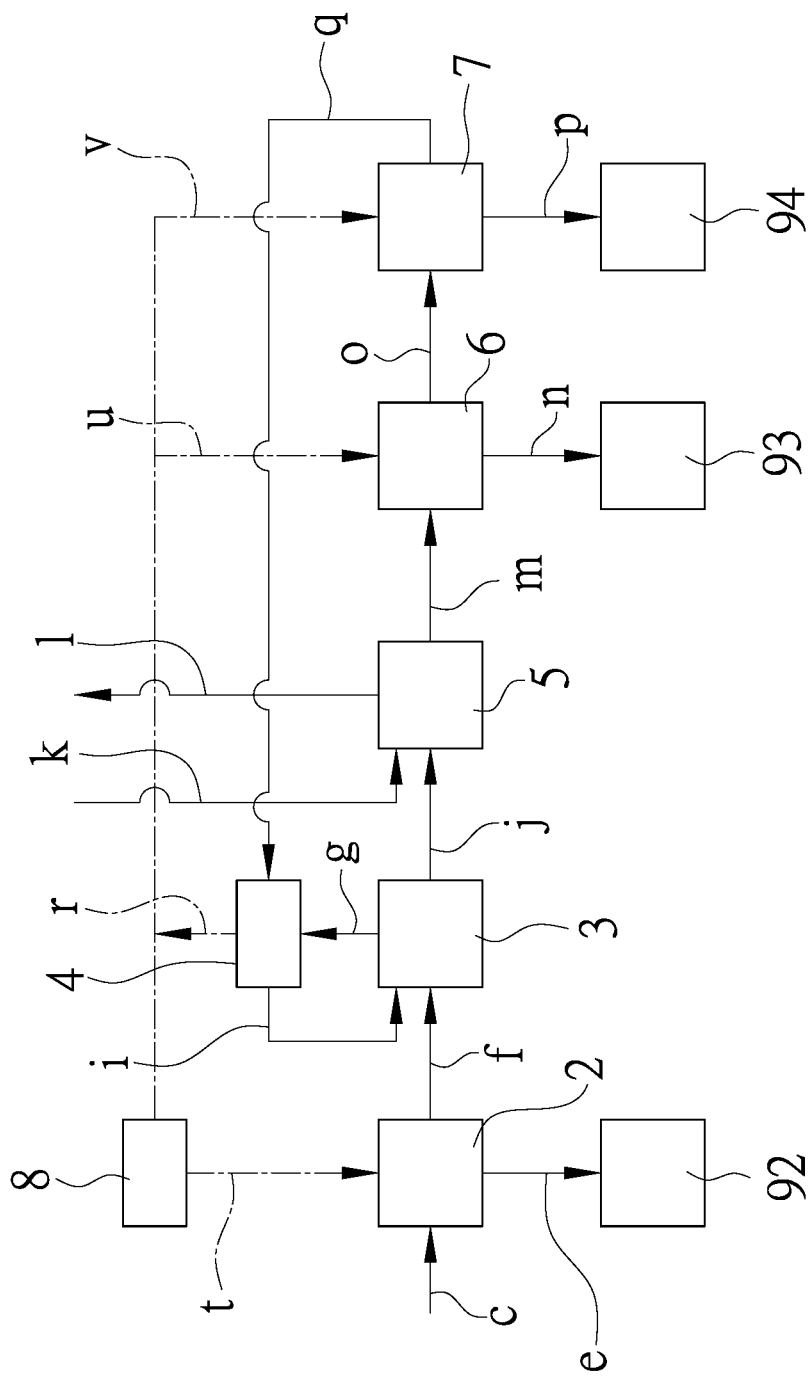

Refer to FIG. 2, another embodiment is revealed. In this embodiment, the seawater pipeline a, the evaporation unit 1, and the fresh water collection unit 91 are omitted while the power generation unit 4 and the hydrolysis unit 3 are connected by the pure water pipeline i. Thereby the seawater is directly replaced by salts such as sodium chloride (NaCl) as a source through the salt pipeline c delivered to the first plasma decomposition unit 2. Similarly, the electricity storage unit 8 supplies power to the first plasma decomposition unit 2 for breaking the sodium chloride delivered through the salt pipeline c into sodium and chlorine. Then the chlorine is sent to the chlorine collection unit 92 for collection while the sodium is delivered to the hydrolysis unit 3 to react with water and get hydrogen gas and sodium hydroxide. Next the hydrogen gas is sent to the power generation unit 4 to generate power and pure water which is sent back to the hydrolysis unit 3 through the pure water pipeline i to be used in sodium-water reaction. As to the sodium hydroxide, it is sent into the carbon dioxide absorption unit 5 to react with carbon dioxide from the atmosphere and get a mixture of sodium carbonate and sodium bicarbonate. Then the mixture is sent to the electric heating unit 6 and broken into carbon dioxide and sodium hydroxide which are respectively sent to the second plasma decomposition unit 7 for decomposition and the sodium hydroxide collection unit 93 for collection. The carbon dioxide is decomposed to form carbon and oxygen gas which are respectively delivered to the carbon collection unit 94 for collection and the power generation unit 4 for generating power cyclically.

Figure 3:
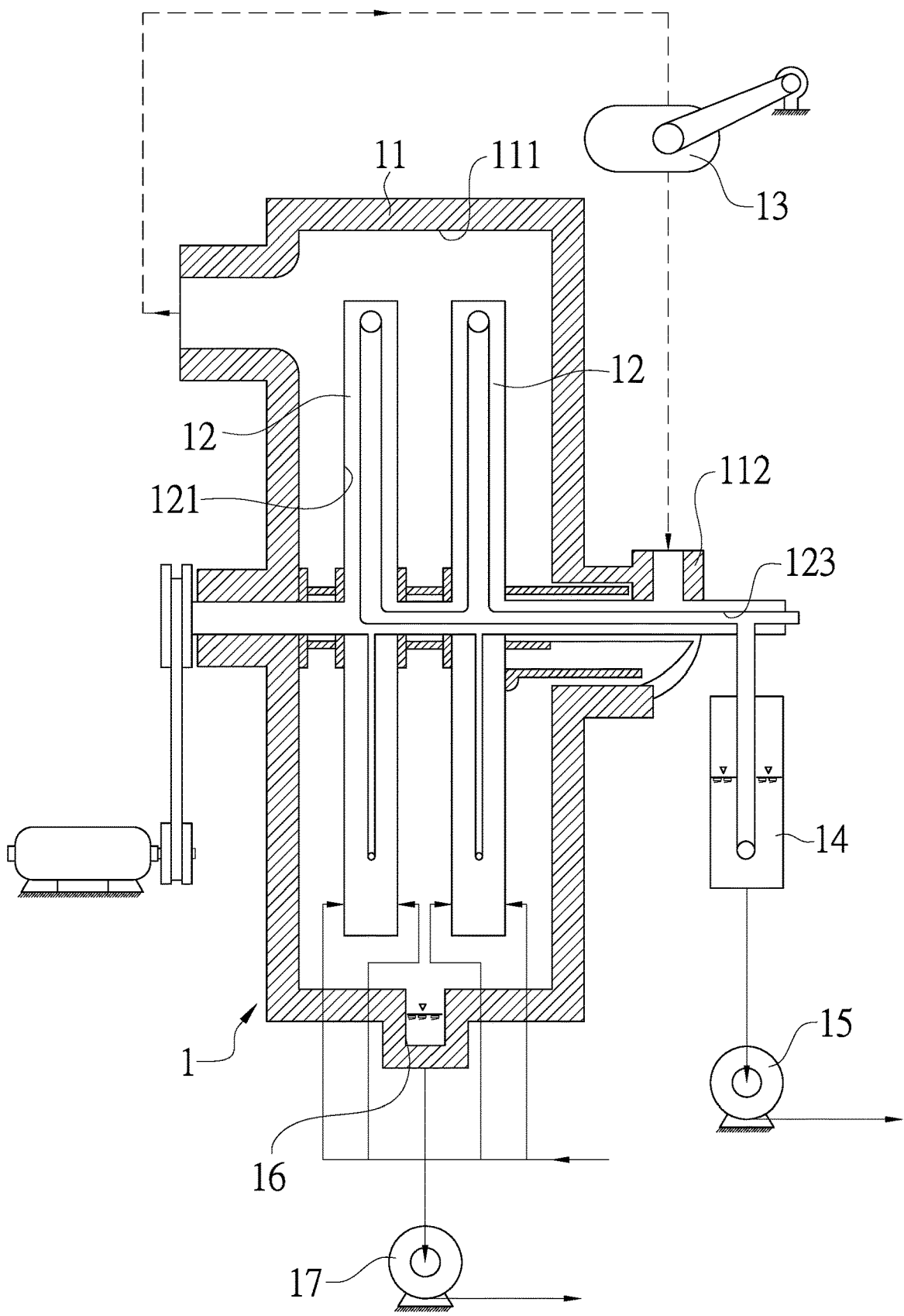
FIG. 3 is a sectional view of a rotary evaporator of an embodiment according to the present invention.
Figure 4:
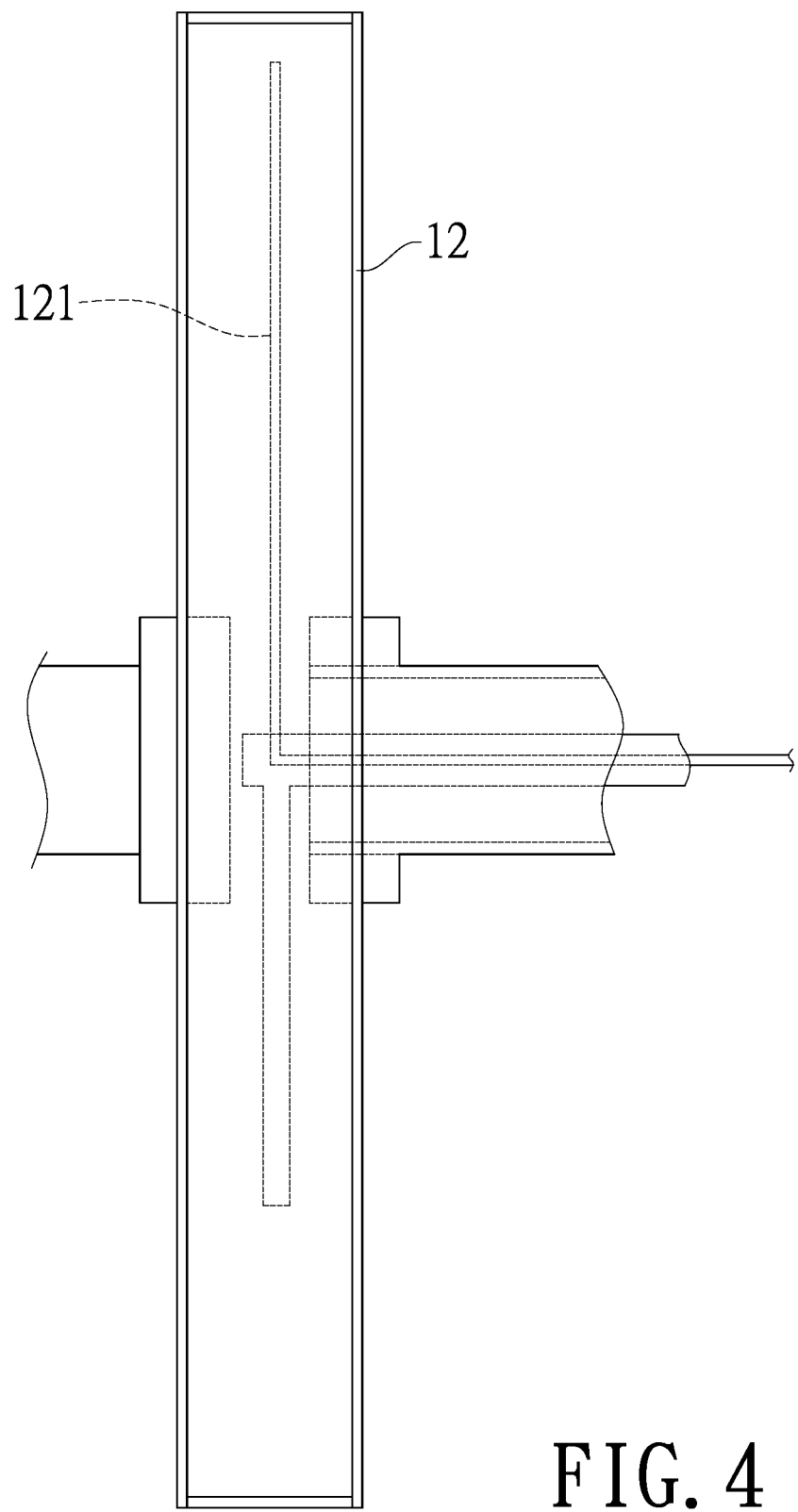
FIG. 4 is a sectional view of a rotary disc of a rotary evaporator of an embodiment according to the present invention.
Figure 5:
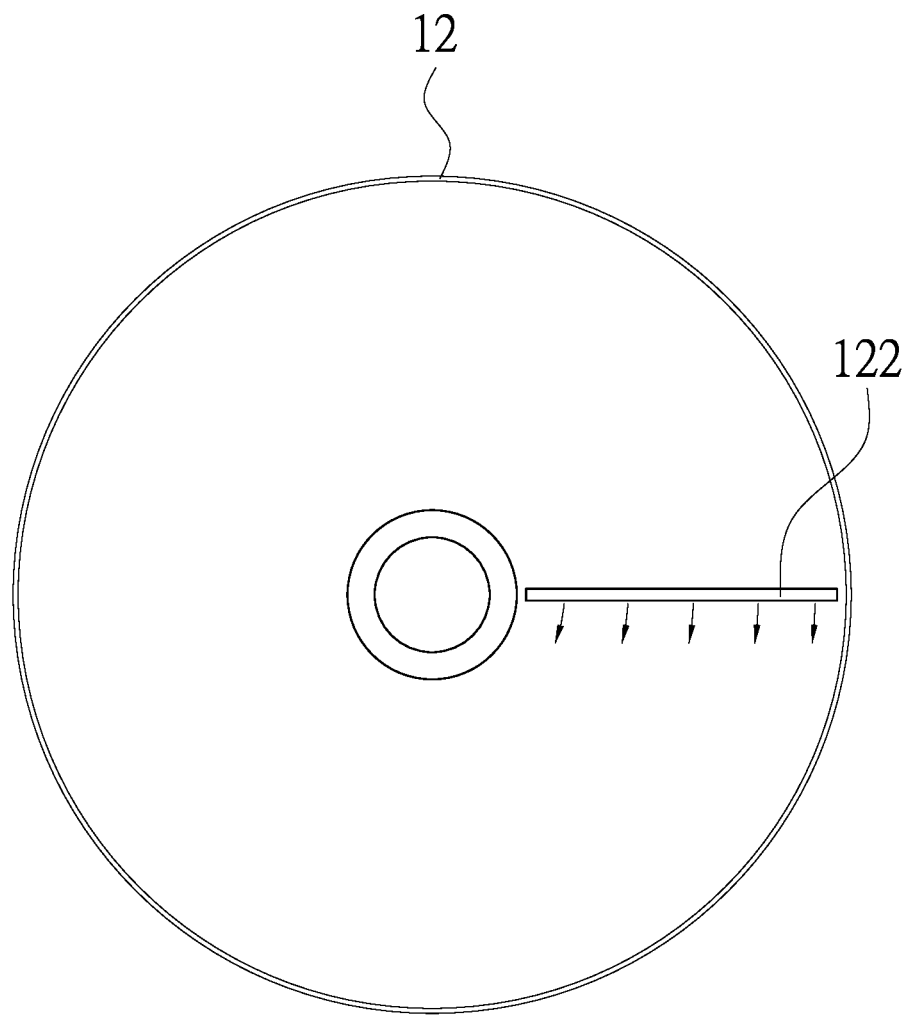
FIG. 5 is a side view of a rotary disc of a rotary evaporator of an embodiment according to the present invention.

Refer to FIG. 3-5, the evaporation unit 1 which is a rotary evaporator includes a housing 11 provided with a hollow portion 111 and an inlet 112, at least one rotary disc 12 mounted in the hollow portion 111 of the housing 11, a compressor 13, a water tank 14, a first pump 15, a temporary storage site for salt water 16, and a second pump 17. The rotary disc 12 consists of a spoon portion 121, a blade 122, and an outlet 123 on the spoon portion 121. While flowing through small channels under the blade 122 of the rotary disc 12, seawater is evenly diffused to an outer surface of the rotary disc 12 for evaporation thereon. Then steam generated is passed through and compressed in the compressor 13, and introduced into the rotary disc 12 through the inlet 112 of the housing 11. The compressed steam is condensed into water in a condenser and then collected by the spoon portion 121 of the rotary disc 12. Later the fresh water condensed is discharged through the outlet 123 on the spoon portion 121 of the rotary disc 12 to be stored in the water tank 14 temporarily. Next the fresh water in the water tank 14 is drawn by the first pump 15 and delivered to the fresh water collection unit 91 for collection through the first fresh water pipeline b. The highly concentrated salt water which is not condensed yet is left in the temporary storage site for salt water 16 at a bottom side of the housing 11 and then drawn by the second pump 17 to be delivered to the first plasma decomposition unit 2 through the salt pipeline c.

Figure 6:
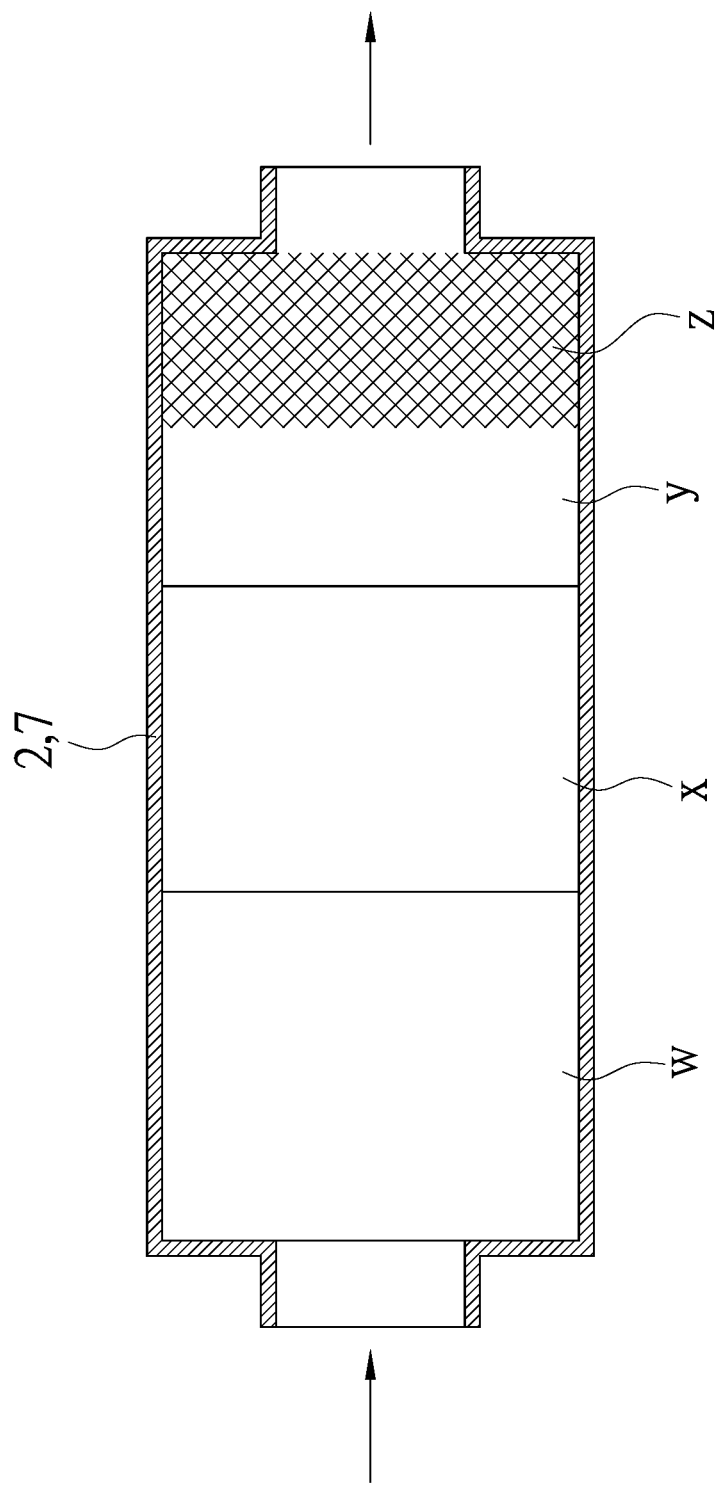
FIG. 6 is a schematic drawing showing processing steps of a photo-plasma decomposition unit of an embodiment according to the present invention.

As shown in FIG. 6, a schematic drawing showing processing steps of the first plasma decomposition unit 2 and the second plasma decomposition unit 7 is revealed. After entering the first plasma decomposition unit 2 which is a photon-plasma decomposition device, the salt water is processed by a plurality of steps including artificially initiated lightning treatment w, photon-plasma decomposition x, energy retention, reform, and regulation y, and separation and purification z in turn to output pure sodium and pure chlorine steadily. Similarly, after entering the second plasma decomposition unit 7 which is a photon-plasma decomposition device, the carbon dioxide is treated by a plurality of steps including artificially initiated lightning treatment w, photon-plasma decomposition x, energy retention, reforming, and regulation y, and separation and purification z in turn to form pure oxygen and pure carbon stably.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalent.

What is claimed is:
1. A resource recovery system for reducing carbon dioxide emissions comprising:
   an evaporation unit which is connected with a seawater pipeline;
   a first plasma decomposition unit which is connected with the evaporation unit by a salt pipeline; the first plasma decomposition unit further connected with a chlorine collection unit and a hydrolysis unit respectively by a chlorine pipeline and a sodium pipeline;
   the hydrolysis unit respectively connected with a power generation unit and a carbon dioxide absorption unit by a hydrogen pipeline and a sodium hydroxide pipeline;
   the carbon dioxide absorption unit connected with at least one air pipeline containing carbon dioxide and at least one air pipeline without carbon dioxide; the carbon dioxide absorption unit further connected with an electric heating unit by a mixture pipeline;
   the electric heating unit respectively connected with a sodium hydroxide collection unit and a second plasma decomposition unit by a sodium hydroxide pipeline and a carbon dioxide pipeline;
   the second plasma decomposition unit respectively connected with a carbon collection unit and the power generation unit by a carbon pipeline and an oxygen pipeline; and
   an electricity storage unit which is connected with the power generation unit by a power input circuit; the electricity storage unit respectively connected with the evaporation unit, the first plasma decomposition unit, the electric heating unit, and the second plasma decomposition unit by a first power output circuit, a second power output circuit, a third power output circuit, and a fourth power output circuit.

2. The system as claimed in claim 1, wherein the resource recovery system for reducing carbon dioxide emissions further includes a fresh water collection unit; the evaporation unit and the fresh water collection unit are connected by a first fresh water pipeline arranged therebetween.

3. The system as claimed in claim 1, wherein the resource recovery system for reducing carbon dioxide emissions further includes a heat recovery unit; the first plasma decomposition unit and the heat recovery unit are connected by a first heat pipeline disposed therebetween while the heat recovery unit and the evaporation unit are connected by a second heat pipeline arranged therebetween.

4. The system as claimed in claim 1, wherein the evaporation unit and the hydrolysis unit are connected by a second fresh water pipeline which is provided with a connector; the power generation unit is connected with the connector of the second fresh water pipeline by a pure water pipeline.

5. A resource recovery system for reducing carbon dioxide emissions comprising:
   a first plasma decomposition unit which is connected with a salt pipeline; the first plasma decomposition unit further connected with a chlorine collection unit and a hydrolysis unit respectively by a chlorine pipeline and a sodium pipeline;
   the hydrolysis unit respectively connected with a power generation unit and a carbon dioxide absorption unit by a hydrogen pipeline and a sodium hydroxide pipeline;
   the carbon dioxide absorption unit connected with at least one air pipeline containing carbon dioxide and at least one air pipeline without carbon dioxide; the carbon dioxide absorption unit further connected with an electric heating unit by a mixture pipeline;
   the electric heating unit respectively connected with a sodium hydroxide collection unit and a second plasma decomposition unit by a sodium hydroxide pipeline and a carbon dioxide pipeline;
   the second plasma decomposition unit respectively connected with a carbon collection unit and the power generation unit by a carbon pipeline and an oxygen pipeline; and
   an electricity storage unit which is connected with the power generation unit by a power input circuit; the electricity storage unit respectively connected with the first plasma decomposition unit, the electric heating unit, and the second plasma decomposition unit by a second power output circuit, a third power output circuit, and a fourth power output circuit.

6. The system as claimed in claim 5, wherein the power generation unit and the hydrolysis unit are connected by a pure water pipeline disposed therebetween.

* * * * *